US011991476B2

(12) United States Patent
Lefranc et al.

(10) Patent No.: US 11,991,476 B2
(45) Date of Patent: *May 21, 2024

(54) METHOD FOR MONITORING DRUG PREPARATION

(71) Applicant: EUREKAM, Lagord (FR)

(72) Inventors: Benoit Lefranc, Charon (FR); Loic Tamarelle, LaHavre (FR); Gael Le Baccon, LaRochelle (FR)

(73) Assignee: EUREKAM, Lagord (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,355

(22) Filed: Mar. 16, 2023

(65) Prior Publication Data

US 2023/0291871 A1   Sep. 14, 2023

Related U.S. Application Data

(60) Continuation of application No. 17/577,119, filed on Jan. 17, 2022, now Pat. No. 11,637,993, which is a
(Continued)

(30) Foreign Application Priority Data

Jun. 20, 2013 (FR) ..................................... 1355817
Oct. 2, 2013 (FR) ..................................... 1359545

(51) Int. Cl.
*G06V 20/00* (2022.01)
*G06F 18/22* (2023.01)
(Continued)

(52) U.S. Cl.
CPC ............. *H04N 7/18* (2013.01); *G06F 18/22* (2023.01); *G06T 7/0014* (2013.01); *G06T 7/70* (2017.01);
(Continued)

(58) Field of Classification Search
CPC ... G06K 9/00; G06K 7/01; H04N 7/18; B65B 3/003; B65B 57/02; G08B 19/00;
(Continued)

(56) References Cited

U.S. PATENT DOCUMENTS 4,855,821 A    8/1989 Swon et al.
4,998,570 A *  3/1991 Strong ................ A61M 5/1782
                                              128/DIG. 1
(Continued)

FOREIGN PATENT DOCUMENTS

WO    WO-0225568 A2    3/2002
WO    WO-2009/073950 A1    6/2009

*Primary Examiner* — Frank F Huang
(74) *Attorney, Agent, or Firm* — Harness Dickey & Pierce, PLC

(57) ABSTRACT

The system aims to solve the problems of security during the production of drug preparations by dematerializing the manufacturing order using a graphic interface combined with a comparative video analysis. The comparison can trigger a suitable warning with real-time monitoring and preferably subsequent inspection of the preparation. A secure imaging system for drug preparations on a predetermined site includes a dynamic graphic interface including at least one processing camera having a focal distance adjusted for the detection of objects and connected to a digital unit for managing video signals from the processing camera. The unit makes a comparison between the stored data of the in-process preparation using first images corresponding to the video signals and steps for preparing stored prescriptions and selects a prescription in accordance with the comparison. A warning is activated in the event that at least one step of the indexed preparation does not comply with the corresponding step of the selected prescription. The system also relates to a filming device, a mounting for positioning objects and a system including the filming device and the mounting for positioning objects.

28 Claims, 6 Drawing Sheets

Related U.S. Application Data division of application No. 14/899,208, filed as application No. PCT/FR2014/051320 on Jun. 4, 2014, now Pat. No. 11,263,463.

(51) Int. Cl.
- *G06T 7/00* (2017.01)
- *G06T 7/70* (2017.01)
- *G06V 20/52* (2022.01)
- *H04N 7/18* (2006.01)
- *H04N 23/51* (2023.01)
- *H04N 23/63* (2023.01)
- *H04N 23/67* (2023.01)
- *H04N 23/69* (2023.01)

(52) U.S. Cl.
CPC ............ *G06V 20/52* (2022.01); *H04N 23/51* (2023.01); *H04N 23/63* (2023.01); *H04N 23/67* (2023.01); *H04N 23/69* (2023.01)

(58) Field of Classification Search
CPC ...... G08B 21/245; G08B 21/00; G08B 21/24; G06F 19/321; G06F 19/327; G06F 19/3418; G06F 19/00; G06Q 10/00; G06Q 50/22; H04Q 9/00; H04Q 2209/47; H04Q 2213/13095; H04Q 5/22; H04Q 2209/04

See application file for complete search history.

(56) References Cited

U.S. PATENT DOCUMENTS

| | | | | |
|---|---|---|---|---|
| 5,597,995 | A | 1/1997 | Williams et al. | |
| 6,011,876 | A * | 1/2000 | Kishner | H04N 5/217 348/E5.079 |
| 7,982,201 | B2 * | 7/2011 | Bryant | G01F 23/292 250/577 |
| 8,170,271 | B2 * | 5/2012 | Chen | G01N 35/00732 382/209 |
| 9,147,334 | B2 * | 9/2015 | Long | H04Q 9/00 |
| 9,305,191 | B2 * | 4/2016 | Long | G06K 7/01 |
| 10,596,319 | B2 * | 3/2020 | Trovato | H04N 5/23218 |
| 11,263,463 | B2 | 3/2022 | LeFranc et al. | |
| 11,501,382 | B1 * | 11/2022 | Wieduwilt | G06Q 50/22 |
| 11,501,393 | B2 * | 11/2022 | Guillama | G06Q 50/22 |
| 2004/0074795 | A1 * | 4/2004 | Fischer | A61C 19/02 206/366 |
| 2005/0217346 | A1 * | 10/2005 | Nagarkatti | G01F 25/11 73/1.16 |
| 2005/0231341 | A1 * | 10/2005 | Shimizu | G01S 15/86 340/901 |
| 2006/0259195 | A1 * | 11/2006 | Eliuk | B01F 33/8442 700/245 |
| 2009/0154764 | A1 * | 6/2009 | Khan | B65B 57/02 348/61 |
| 2010/0245577 | A1 * | 9/2010 | Yamamoto | B60R 1/00 348/148 |
| 2012/0154582 | A1 * | 6/2012 | Johnson | G16H 40/20 340/521 |
| 2014/0126873 | A1 * | 5/2014 | Cooke | G02B 6/4471 385/139 |
| 2015/0077215 | A1 * | 3/2015 | Ranky | H05K 3/1258 264/105 |
| 2017/0126873 | A1 | 5/2017 | McGary et al. | |

* cited by examiner

METHOD FOR MONITORING DRUG PREPARATION

CROSS-REFERENCE TO RELATED APPLICATIONS

The present application is a continuation of U.S. patent application Ser. No. 17/577,119 filed on Jan. 17, 2022, which is a divisional of U.S. national phase patent application Ser. No. 14/899,208 filed on Dec. 17, 2015, which issued as U.S. Pat. No. 11,263,463 on Mar. 1, 2022, which is a U.S. national phase entry of PCT international patent application serial no. PCT/FR2014/051320 filed on Jun. 4, 2014, which claims priority to French patent application serial no. 1355817 filed on Jun. 20, 2013, and which claims priority to French patent application serial no. 1359545 filed on Oct. 2, 2013, all of which are incorporated by reference herein.

BACKGROUND AND SUMMARY

The invention relates to a method for the secure, namely controlled and assisted, production of drug preparations and to an imaging system adapted to implement such a method.

The scope of the invention relates to the secure production of drug preparations enabling a release monitoring of such preparations. Such release monitoring is necessary since drug preparations are executed according to complex protocols, from reaction mixtures between components, with each component having a concentration adapted to a customized treatment for a given patient.

Any error on the nature of a component or the amount thereof may entail serious consequences for the patient whom the preparation is administered to, especially when a toxic active substance is involved, such as cytotoxic preparations used in cancer treatments.

In practice, operators can work several hours running, for example in hospital preparation units, which substantially increases the risk of error on the composition or amounts of the components. Securing the preparations usually results from a double visual checking: checking of the key steps of each preparation and report in writing on an appropriate tracking medium, usually called a "Production Sheet".

In order to guarantee the quality of the drug preparations, AFSSAPS (French Agency for Safety of Health Products) published "Good Manufacturing Practices" which are a reference text for pharmacists. "Good Manufacturing Practices" specify the three obligations that must be complied with when implementing the raw materials used in drug preparations:
- the method for measuring the amounts of raw materials is selected according to the nature thereof and the quantity to be measured;
- the volume measurement or the weighing of raw material quantities are saved;
- the raw materials are permanently identifiable during the above operations.

During the preparation, the nature of each raw material used as well as the weight or volume thereof are thus independently checked either by automatic saving means, or by a second person qualified under the terms of the Public Health Code and checking is noted in the preparation batch file. To meet the "Good Manufacturing Practices" and for the patient's safety, a double-checking of the nature and quantity of the compositions used in each preparation is thus recommended.

A device for monitoring and recording the times required for the dissolution and/or the disintegration of drug tablets in a container is known from U.S. Pat. No. 4,855,821. The camera lens is mounted on a side of the container. In this document, the monitoring and recording do not make it possible to check, in real-time, the nature of the compositions of the tablets or the volume thereof. The patent document EP 1,867,998 provides a recognition of laboratory equipment from a RFID radio frequency identification tag (the initials of Radio Frequency Identification Device in English terminology) associated with a tag reader positioned on the instrument mounting and connected to a positioning stop. This solution is intended for the location and identification of laboratory equipment but it does not make it possible to check the nature, the volume or the weight of laboratory equipment.

The invention aims at remedying the problems mentioned above by dematerializing the production sheet using a graphic interface combined with video comparative analysis so as to cause the possible triggering of an appropriate warning with a monitoring in real time and an a posteriori control of the preparation. More specifically, the present invention relates to a method for the secure production of drug preparations in compliance with a prescription on a predetermined site. The method consists in monitoring the preparation at least in real time using a dynamic graphic interface using at least a so-called processing video stream making it possible to view the products on the preparation site with a display of information relating to the prescription once detected by digital processing for identifying the components of the preparation and by comparing data of the steps of the preparation and stored data of the step of the prescription, in triggering a warning in case of a detected non-compliance between the data of the steps of the preparation and the prescription, and in validating the preparation in case of compliance between the steps data. The information relating to the prescription is preferably selected from a list of available vials according to the prescription and a list of vials used with the evolution of the volume of component taken from each of these. A display of the evolution of the volume injected into a delivery packing and/or the missing volume and a warning display are also provided, with such information being optionally accompanied by a manual interaction to sample, inject a specific volume or to add a vial.

In advantageous embodiments:
- one of the so-called processing video streams is focused on object analysis data for a validation of steps, specifically of key steps of the preparation, and a so-called scene second video stream is focused on an overall view of the actions executed and the location of objects on the site;
- the detection extends to an automatic identification of the syringes by processing the first video streams using shape and character recognition;
- the processing stream consists of a double parallel stream, with each stream being adjusted for detecting objects in substantially different size ranges;
- an increment of the injected volumes and consequently of the remaining volume, of the number of injections, of the number of vials and of the leftovers is also automated from the graphic interface;
- the real-time warning is triggered if the vials and/or the volumes of the component detected prior to an injection do not comply with the prescription according to a stored protocol, with the warning being cancelled and the preparation being able to go on only if the compliance with the prescription is validated according to also displayed guidelines, with the progress of the preparation being then updated;

the progress of the preparation is monitored in real time according to the data of the protocol of the identified prescription;

the release of the preparation is validated by a confirmation that a stored patient's identification tag matches the patient's tag present on the delivery packaging;

as the steps of the preparation are indexed, the steps detected as incorrect are identified by comparison with the step of the prescriptions, and the subsequent validation of the steps detected as incorrect, especially key steps of the preparation, make it possible to go on with the preparation;

an a postieriori check carried out by a subsequent viewing of the video images is associated with each preparation with a synchronous browsing through at least two video streams, a processing stream focused on validation objects of the steps of the preparation and a so-called scene video stream focused on an overall viewing of the actions executed on the preparation site, in conjunction with the indexing of the analyzed steps, more particularly the key steps:

browsing through the history of the stored preparations is controlled by a search engine built in the digital control unit.

The invention also relates to a secure system for drug preparations on a predetermined site comprising a dynamic graphic interface comprising at least one viewing and recording so-called processing camera having a focal length adjusted for the detection of objects liable to contain components and connected to a digital unit managing the video signals from the processing camera. Said unit has means for establishing a comparison between the stored data of the preparation in progress using the first images corresponding to the video signals and steps of the preparation of the prescriptions stored in a prescription memory and means for selecting a prescription in accordance with such comparison. Information on the selected prescription is displayed with the images transmitted by the digital management unit on display means. Besides, warning means are able to be activated in the event that at least one step of the indexed preparation does not comply with the corresponding step of the selected prescription.

In preferred embodiments:

the indexing means is adapted to index special steps specific to each prescription, so-called key steps, through the integration of information relating to each key step, in order to provide a synchronous indexation of the video streams upon the a posteriori checking, with the warning means being triggered in the event of non-compliance with at least on step of the preparation, especially a critical step;

the dynamic graphic interface comprises at least another recording and viewing so-called scene camera having a focal length adjusted for the global detection of the site, with the processing camera and the scene camera having synchronized streams;

the processing camera is composed of two cameras placed side by side having a focal length adjusted for the detection of objects in additional dimension ranges;

the processing camera is positioned at a mounting for positioning the products and preparation objects;

the scene camera is positioned at a higher level so as to enable an overall view of the site;

the mounting has a structure configuration adapted to the shape of the objects, which favors a stable and reproducible depositing of the objects, in particular the vials and the syringes, and includes a backlighting device for accurately reading syringe gradations.

The invention also relates to a device for filming a plurality of objects such as a vial and syringe, for the secure production of drug preparations. According to the invention, the device comprises:

at least a pair of filming devices positioned opposite one another, a reflective element for each one of the filming devices, with the two reflective elements of the same pair of devices being positioned between said devices along the axis defined by the two devices and each one being oriented so as to reflect images of a drug preparation production area towards the matching device.

The device may have one and/or the other of the following characteristics:

the two areas covered by the two devices of the same pair of devices are identical, and the devices have different zoom lens making it possible to focus on objects with different sizes which are present in the drug preparation production area, the two reflective elements consist of flat surfaces associated together by a common edge, the two flat surfaces are formed by two adjacent faces of a prism with a triangular cross-section, the device comprises an elongate base at both ends of which the filming devices of a same pair are attached, with the associated reflective elements being attached to the base, the device comprises means for attaching to a mounting for positioning the objects involved in the production of a drug preparation, the device comprises means for attaching to a production chamber of a drug preparation.

The invention also relates to a mounting for positioning objects comprising at least one syringe and one vial of a fluid to be taken with the syringe, comprising a flat base for supporting the objects, a screen standing at the back of the base and a syringe holder mounted to translate with respect to the base between a disengaged position independent of the base and an engaged position in the base. The positioning mounting may have one and/or the other of the following characteristics:

the syringe holder is mounted to translate through a slide connection with the base in a recess formed from the upper face of the base, the upper surfaces of the base and of the syringe holder are co-planar and comprise matching reliefs for accommodating a vial, which form a relief for accommodating the bottom of a vial, such as a recess or a rib, when the syringe holder is in its engaged position, the syringe holder comprises a rack for retaining the wings of a syringe and a longitudinal block for supporting the body of the syringe, when the syringe holder is in its engaged position, the recess for accommodating the bottom of a vial is positioned between the rack retaining the wings of a syringe and the block for supporting the body of the syringe, when the latter is in its engaged position.

The invention also relates to a system for filming a plurality of objects for the production of a drug preparation comprising a filming device as defined above, a mounting for positioning objects as described above, and a chamber for producing drug preparations, with the mounting for positioning objects being positioned inside the chamber, and the filming device outside thereof against a transparent window of the chamber, and at a position such that images of the mounting for positioning objects, can reach the filming devices of the system. In this system, the filming device and the mounting for positioning objects preferably comprise additional attaching means placed opposite each other on either side of the transparent window.

BRIEF DESCRIPTION OF THE FIGURES

Other data, characteristics and advantages of the present invention will become apparent from the following non-restrictive description, with reference to the appended figures which represent, respectively.

DETAILED DESCRIPTION

Figure 1:
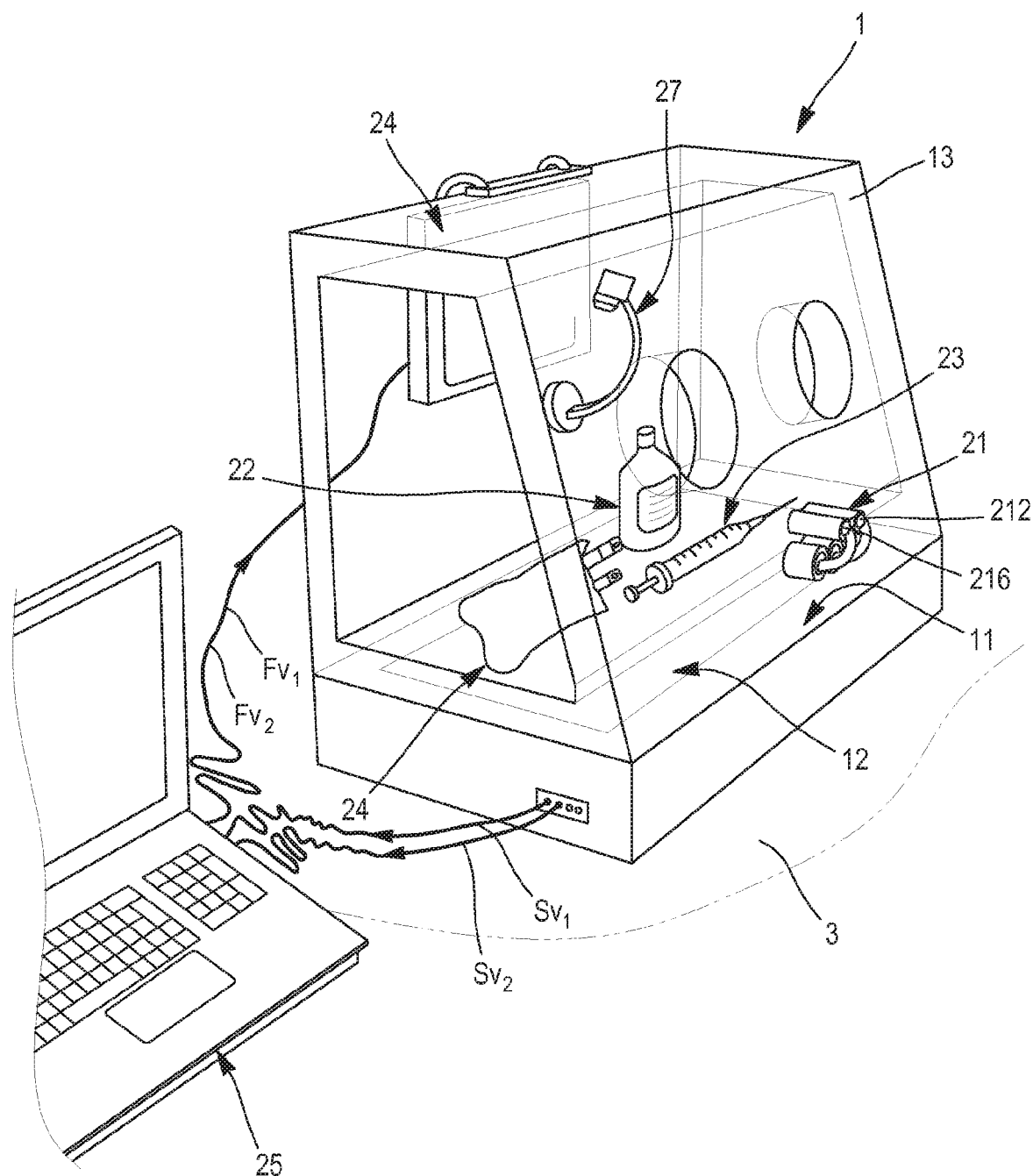
FIG. 1 is a perspective view of a drug preparation site equipped with an example of the secure imaging system for such preparations.

Reference is made to the perspective view of FIG. 1 showing a portable hood 1 incorporating a drug preparation site 10. The site 10 is equipped with an imaging system 20 for the secure production of such preparations. This system includes a so-called processing camera 21. The focal length of the camera 21 is adjusted to focus on containers and drug administration tools, here 22 a vial, a drip pouch 24 containing a saline solution, and a syringe 23. In the example the vial 22 contains cisplatin to be diluted in the drip pouch 24. For this purpose, a sample is taken by the operator from the cisplatin vial 22 using the syringe 23 and then injected into the drip pouch 24. The operation is repeated until the desired dilution of the active ingredient in the pouch is obtained to prepare, in the example, a polychemotherapy component.

Advantageously, the bottom 11 of the hood 1 has a structure configuration adapted to the shapes of the objects, which favors a stable and reproducible deposition of the vials and syringes, and includes a backlighting device 12 facilitating the reading of the syringes gradations 23. The processing camera 21 is positioned at the bottom of the hood 11, slightly above the workbench 3 whereon the portable hood 1 is placed, i.e., substantially, facing the operator's stomach (not shown), in the example. The processing camera 21 is connected to a digital management unit, a laptop computer 25 in the example. The computer 25 mainly comprises a processor and memories (not shown) which process the video signals Sv1 from the processing camera 21 to provide images to a display screen 24 and record same.

The display screen 24 then makes it possible to view information corresponding to the preparation in progress from the video stream $FV_1$ provided by the processing camera 21.

Another recording and viewing so-called scene camera 27, has a focal length adjusted for an overall detection of the site 10. The lens of the scene camera 27 is advantageously positioned at the upper level 13 of the hood 1 so as to enable an overall view of the site 10 by transmitting a video stream $FV_2$ to the display screen 24. The processing 21 and scene 27 camera provide video signals $SV_1$, $SV_2$, synchronized by the computer processor 25 so as to form a dynamic graphic interface for real-time and a posteriori controls. The processing camera 21 is advantageously composed of two camera placed side by side 21a, 21b, the focal length of which is adjusted to detect objects—vials and syringes in general—in additional size ranges of less than 3 cm and ranging from 3 to 10 cm in this example.

Figure 2:
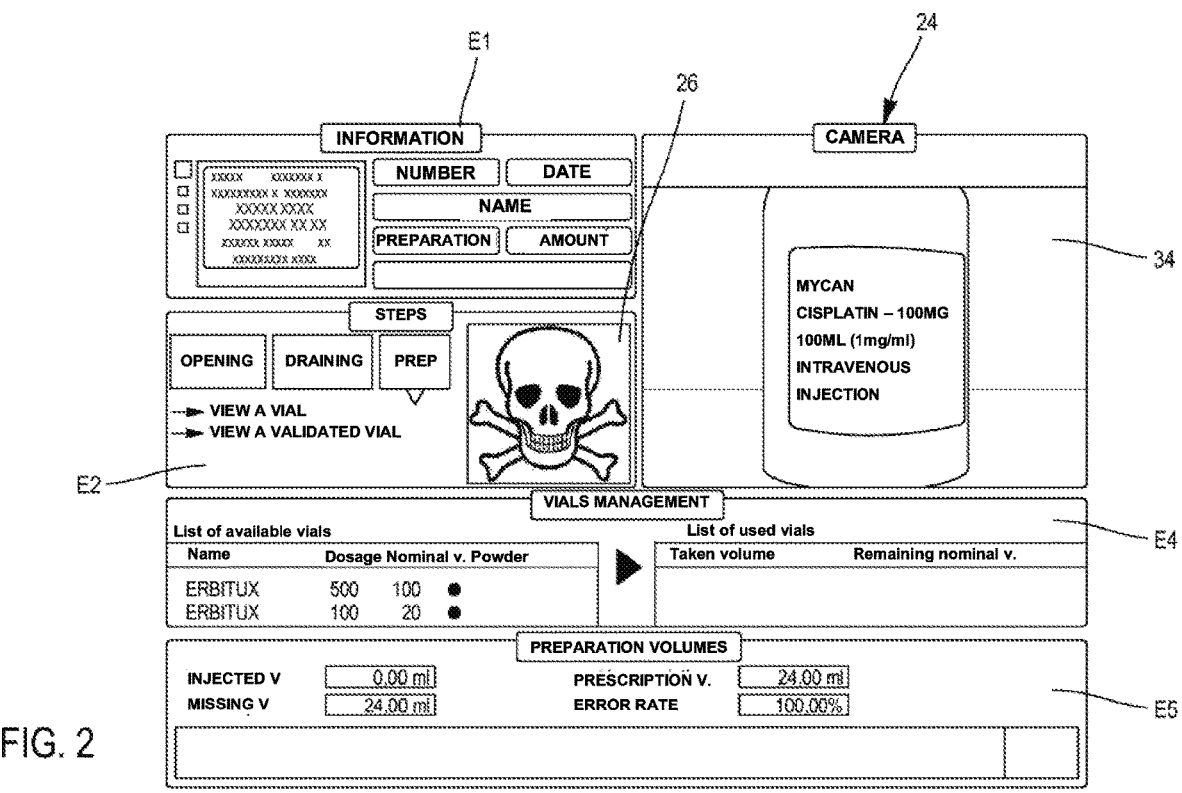
FIG. 2 is a view of the real-time display of the invention incorporating an image provided by a processing camera.

An example of real-time display on the screen 24 is shown in FIG. 2. The display includes here an image 34 from the video stream from the processing camera 21b focused on the cisplatin vial 22. The video stream of the processing cameras 21a and 21b are analyzed by a shape and character recognition tool, built in the computer processor 25 (see FIG. 1).

The analysis enables the automatic identification of the objects used, i.e., a vial 22 and a syringe 23, by processing the first video streams using the recognition tool. The detection of product volumes contained in the syringes and the vials enables a non-destructive control of the active substance used in the preparation. The delivery of the preparation is validated by a match between the patient's identification tag stored in the information insert E1 and the patient's identification tag on the syringe.

All data printed on the vial 22 tag 22a, in particular the concentration in active substance are thus identified by said recognition tool. Such data is stored in the computer 25. During the preparation, analysis data relative to the vial and syringe content are displayed on the screen 24 and saved for validating each step of the preparation: amount of liquid in the syringe 23 and the liquid level in the vial 22 (see below).

The computer processor 25 searches a memory, wherein a set of prescription corresponding to the preparations are indexed by steps using a digital indexing tool. The key steps—i.e., the specific steps that are specific to each prescription—have a particular indexation, for example EC1, EC2.

The processor compares the stored data of the preparation in progress provided by the first recorded images 34—name of the components, amounts poured into the syringes, etc.—and steps of the stored prescriptions. As soon as a key step of such prescription is recognized, the prescription corresponding to the preparation in progress is then identified and displayed through the steps thereof in an insert E2. Information is selected based on the prescription detected from a list of available vials and a list of vials used which has been stored in the computer according to data supplied by the laboratory management center. A warning display 26 is integrated in the insert E2 as well as the possibility of a manual interaction to sample or inject a given volume, or add a vial.

In addition, the progress of the preparation is displayed based on data of the stored protocol corresponding to the identified prescription: information relative to the management of the volume contained in the vial 22 and the evolution of the injected/missing/prescribed component volumes in the syringe 23 are displayed respectively in the inserts E4 and E5. Such management information is initiated by an increment of the injected volumes and consequently the remaining volume, the number of injections, the number of vials and the remaining quantities. This increment is automated from the graphic interface of the synchronized video streams from the cameras 21 and 27. Such management makes it possible to significantly reduce the errors due to handling operations.

The warning display 26 is activated in real time as soon as the vial and/or the component volumes detected prior to the injection in one step do not comply with the stored protocol of the identified prescription. The steps detected as errors are identified by comparison with the steps of the prescription. Non-compliance of a key step triggers a search for errors in the identification of the prescription which has been selected.

The display then provides guidelines in the insert E4 and the warning is cancelled and the preparation goes on only if the compliance between the steps of the preparation and those of the protocol of said prescription is validated. The progress of the preparation is then updated in real time until the final validation indicated in the insert E2. The preparation is thus secured by an almost instantaneous reactivity and the reproducibility of the preparation is optimized. The validation of the steps detected as incorrect, especially the key steps of the preparation makes it possible to carry on the preparation up to the completion thereof.

Figure 3:
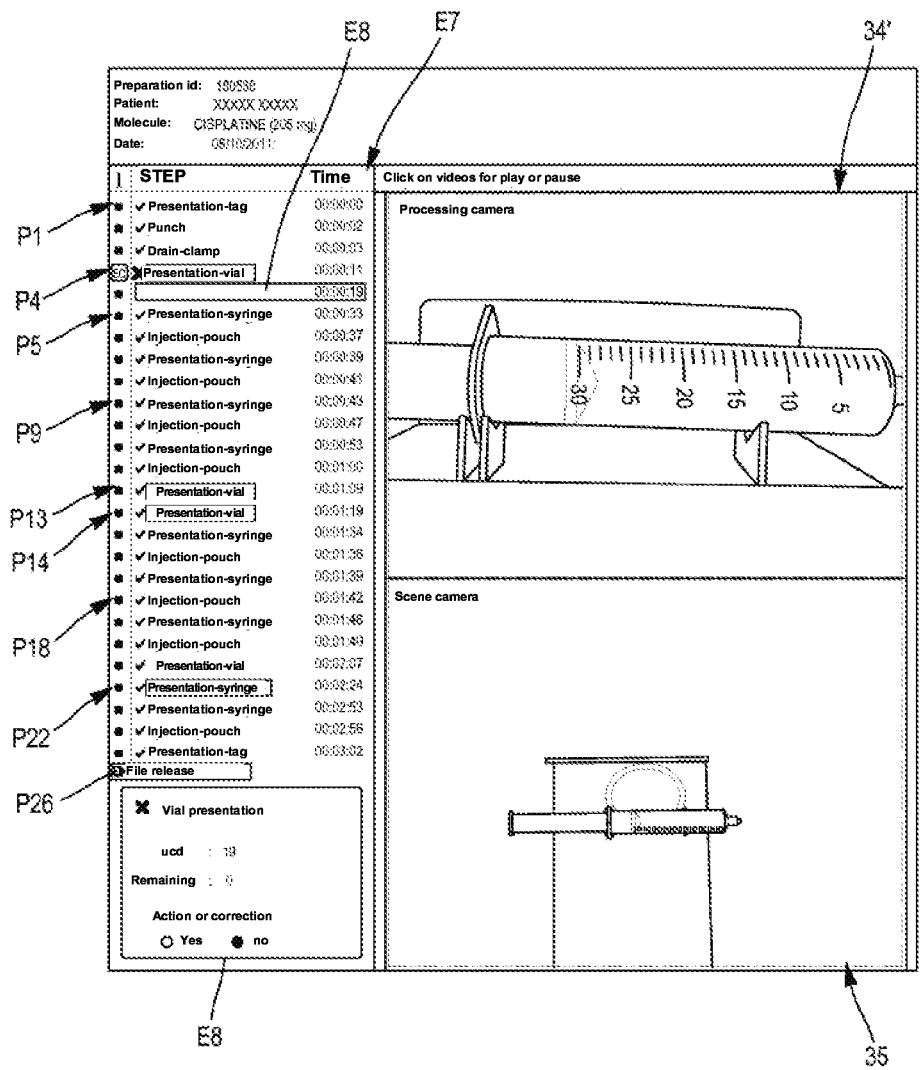
FIG. 3 is a view of the display of an a posteriori control of a drug preparation obtained using a processing camera and a scene camera.

Referring to FIG. 3, the a posteriori checking of the cisplatin-based preparation is displayed on the screen 24. The stored tags of the preparation and of the patient are displayed in an insert E6 (patient's name, active molecule and injection date). Recorded images of the processing 34' and scene 35 video streams respectively from the processing camera 21 and the scene camera 27 are also displayed. The scene video stream is focused on an overall viewing of the actions executed and of the location of the objects on the site 10, here the vial 22 and the syringe 23. The a posteriori checking is executed through a subsequent viewing of the video recordings from a synchronous browsing between the processing and scene video streams, in conjunction with the indexing of the steps of the preparation, of the key steps in this example.

Thus, the steps of preparation P1 to P26, the indexing of the key steps "I", as well as the time of their implementation are displayed in the insert E7. In the example, the step P4, i.e., the step of presentation of the vial P4 is not validated. This is a key step the correction of which is saved as necessary for the final validation. This situation is explained by displaying a particular insert E8. Other key steps of the vial presentation (P13, P14) and syringe presentation (P5, P22) are indexed. Additionally, the previous preparations are stored and browsing through a history of such preparations, controlled by an integrated search engine, makes it possible to display comparisons with the preparation in progress.

The invention is not limited to the embodiments described and shown. The preparation can thus be in a stationary hood or any environment adapted to install the imaging system. Besides, the number of cameras is not limited to two or three but adapted to the types of preparation desired. Similarly, the management of the steps of the preparation can be adapted to the various prescriptions. In addition, a final report is prepared on the conditions of production of the preparation from the recordings, with highlighting of errors and problems.

Figure 6:
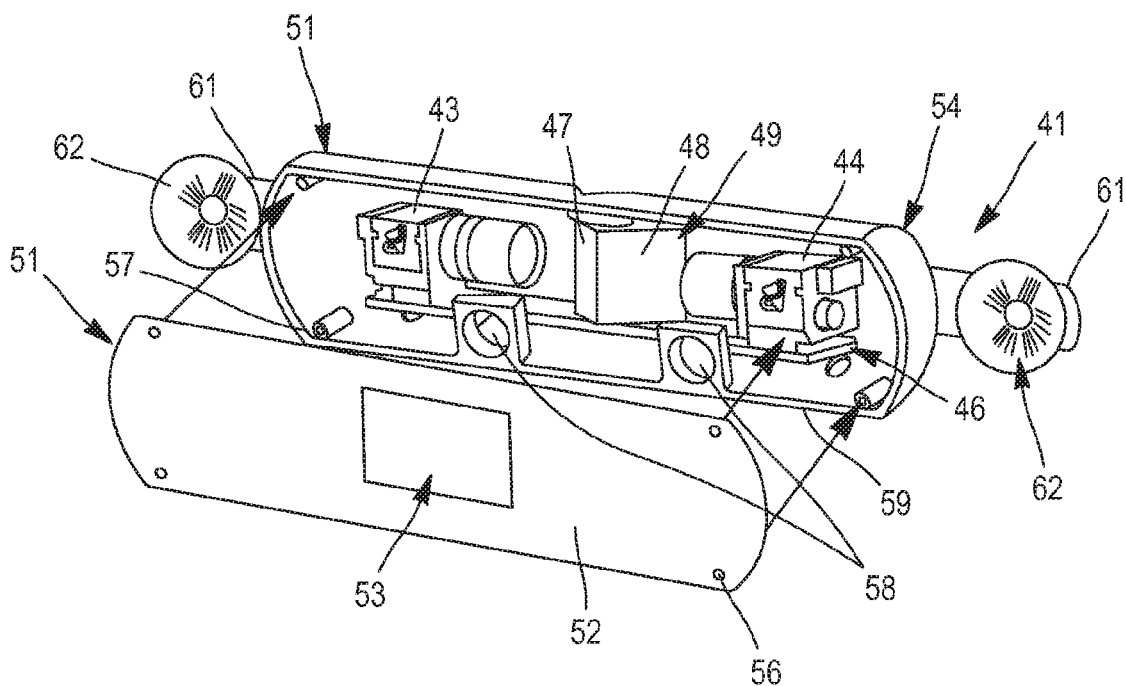
FIG. 6 is an exploded view of the device of FIG. 4.

Referring to FIGS. 4 to 9, an exemplary filming system implementing the method for the secure production of drug preparations is described. This system is positioned on either side of a transparent window 40 of a chamber used for the secure production of a drug preparation, and comprises a filming device 41 positioned outside the chamber against the transparent wall 40, and a mounting for positioning objects 42 positioned inside the chamber opposite the filming device. More specifically, as best seen in FIG. 6, the filming device 41 comprises two processing cameras 43, 44 positioned at both ends of an elongated, rectangular base 46, a reflective element 47, 48 for each filming device 43, 44, positioned at mid-length of the base 46.

The two reflective elements 47, 48 are oriented along the axis defined by the two cameras, so as to reflect images of the syringe and vials support 42 towards the corresponding camera. More specifically, the two reflective elements are formed by two adjacent rectangular faces of a totally reflecting prism with a triangular cross-section 49, with the prism being mounted on the base through one of its triangular bases.

The two cameras 43, 44 have different focal lengths to focus on objects of various dimensions placed on the syringes and vials mounting. For example, the right camera can be devoted to the focusing on small-sized vials and syringes with a 12 mm lens, the left one on large vials and syringes with an 8 mm lens. For the filming device to have small dimensions, both cameras will also have small dimensions, for instance 47×29×29 mm (L×W×H). One example of cameras suitable for such use is reference DFK23F445 by Imaging Source®.

The elongated base 46 is attached inside a box 51 comprising a front flat and substantially rectangular face 52, with two shorter sides slightly rounded, and provided with a substantially rectangular viewing central window 53 and a rear elongated shell 54 wherein the base is firmly attached by its rear longitudinal edge, with the prism 49 being placed in the window opening 53 when the front face 52 of the box closes the shell 54, so that the images of the syringes and vials mounting can reach both cameras 47, 48 through the prism. The front face 52 may be attached to the shell 54 by means of screws passing through holes 56 provided from this purpose at the four corners of the front face and screwed into a corresponding sleeve 57 provided for this purpose on the inner wall of the rear shell 54.

The rear shell 54 also comprises two lugs 58 extending vertically from its lower side edge 59, with such lugs being provided with a circular central recess for accommodating a matching magnetic means (a metallic or magnetized chip, not shown) intended for holding the syringes and vials 42 mounting which is provided with additional magnetized means against the glass wall 40 and the front face 52 of the box. The shell 54 further comprises two rigid side plates 61 attached to the external face of its back wall and protruding from both sides of its ends, with these two plates 61 carrying two suction cups 62 facing forward in order to be attached to the glass window of the chamber.

Figure 4:
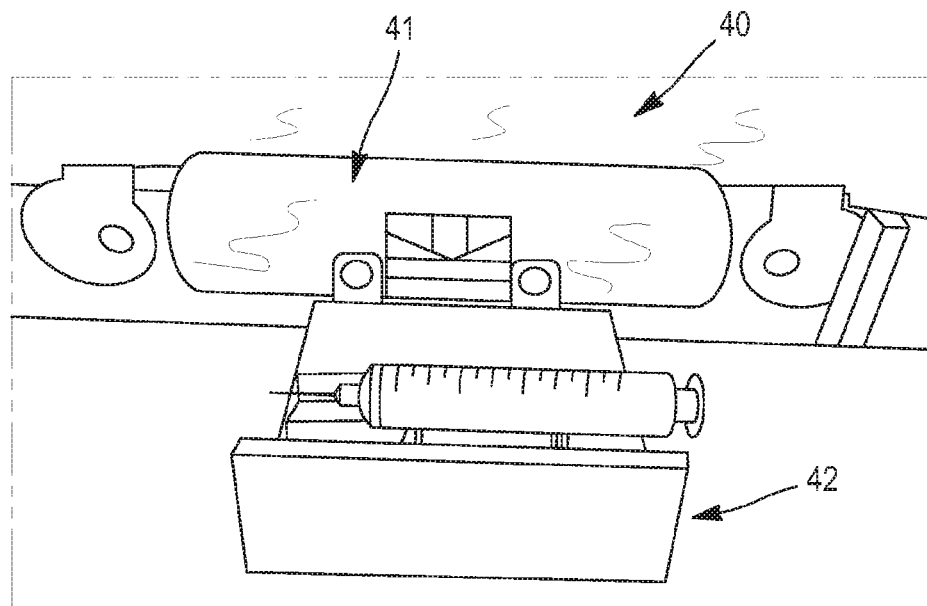
FIG. 4 is a front perspective view of a system for filming syringes and vials of various sizes, including a preparation chamber, a mounting for syringes and vials, inside the chamber, and a filming device outside the chamber.
Figure 5:
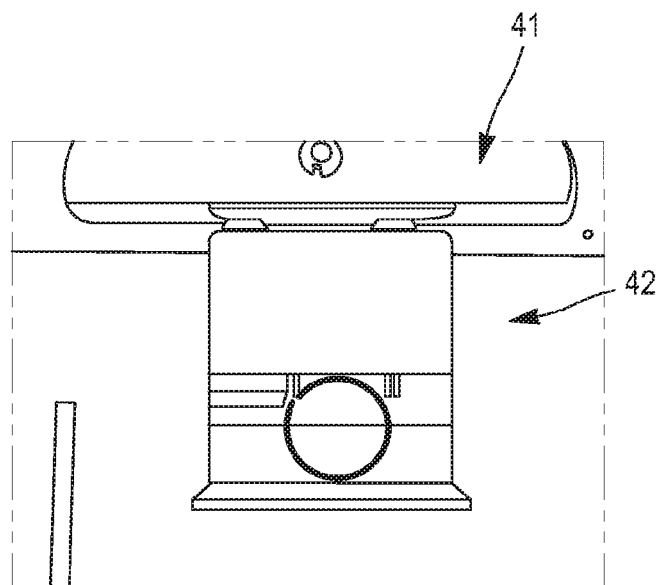
FIG. 5 is a perspective top view of the system of FIG. 4.
Figure 7:
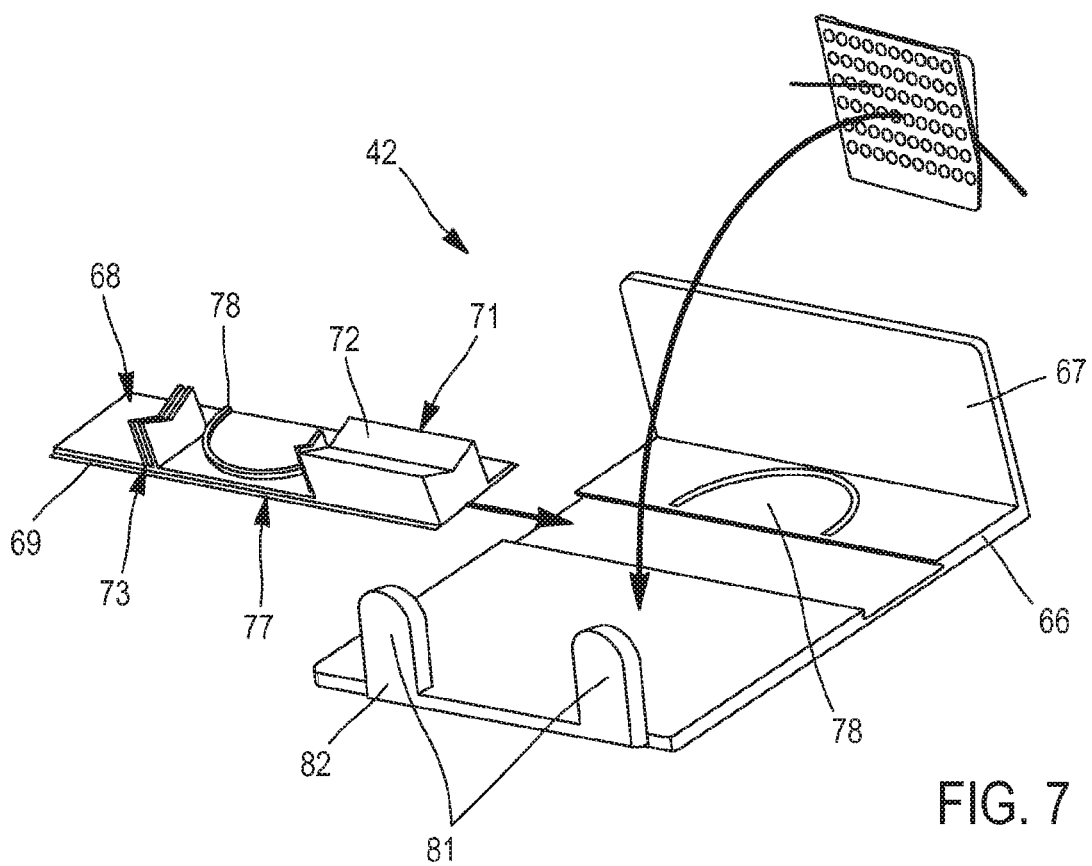
FIG. 7 is an exploded view of the mounting for syringes and vials of FIG. 4, showing a syringe holder in the disengaged position with respect to a support base.
Figure 8:
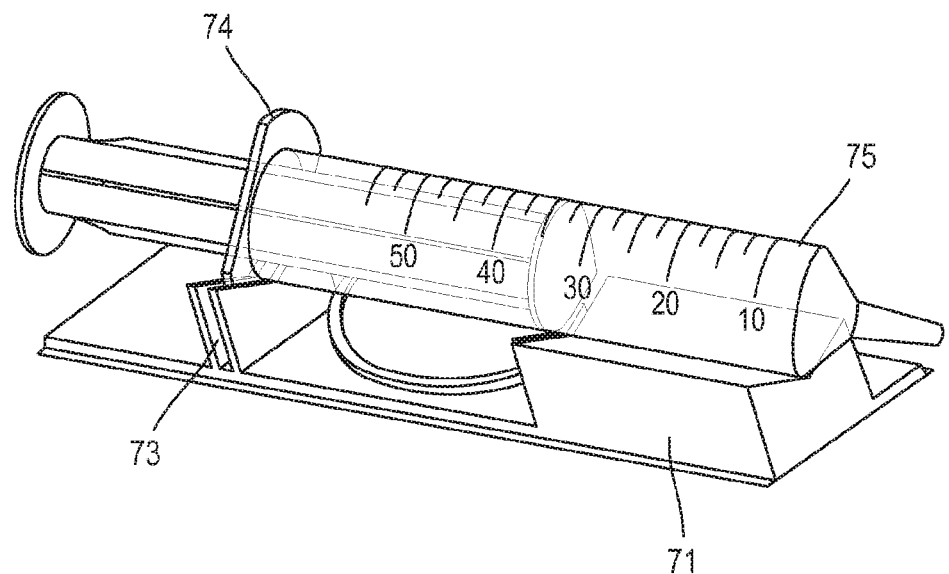
FIG. 8 is a perspective view of the right side of the mounting supporting a syringe.
Figure 9:
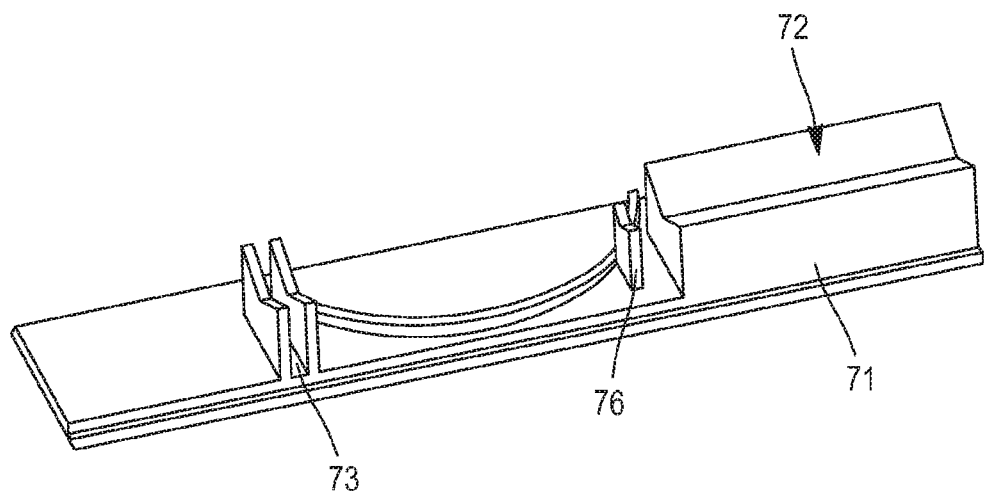
FIG. 9 is a perspective view of the left side of the mounting without a syringe.

Moreover, according to FIG. 7, the syringes and vials mounting 42 comprises a mounting flat base 66, an inclined screen 67 standing behind the base to form a white background and a syringe holder 68 mounted to translate relative to the base 66 between a disengaged position independent of the base 66 (shown in FIG. 7) and an engaged position in the base 66 (shown in FIG. 4). More specifically, the syringe holder 68 comprises a rectangular plate 69, at one end of which a block 71 protrudes, which has a substantially rectangular shape but the upper wall of which is a longitudinal recess 72 (the upper wall is made of converging inclined surfaces joining at a common edge, thus defining a "M"-shaped cross-section) to be used as a mounting for the body of a syringe, and to laterally hold such syringe body by the inclined faces.

At the other end, the plate 69 of the syringe holder 68 comprises a rack 73 retaining the wings 74 of a syringe 75. Such rack 73 is formed by two parallel walls, separated from each other by a distance sufficient to accommodate the wings 74 of a syringe 75 (see FIG. 8), and have the shape of a "M", like the block 71, to support and laterally hold syringe part near the wings 74. According to FIG. 9, an additional rack 76 is provided for the small-sized syringes mounting, between the block 71 and the main rack 73, closer to the block 71, and in the form of a "M"-shaped single wall 76 and the groove of which is at the same level as that of the block 71.

As shown in FIG. 7, the plate 69 of the syringe holder 68 comprises two thinner side edges 77 adapted to slide in grooves formed on the side edges of a recess accommodating the plate provided in the base 66 so as to slidingly engage the syringe mounting in the base up to an engaged position (FIG. 4). In this engaged position, the syringe mounting 68 and the base 66 together define a relief for accommodating the bottom of a vial 78.

Specifically, the upper surfaces of the base 66 and the plate 69 of the syringe mounting 68 are coplanar when the syringe holder is in its engaged position and comprise complementary recesses 78 for accommodating half disc-shaped vials and which form a circular recess for accommodating the bottom of a vial when the syringe holder is in its engaged position, with the recess being then positioned between the retaining rack 73 and the support block 71. Of course, another relief, such as a circular rib, may provide the same function. The base 66 carries the magnetic means 81 matching those 58 provided on the filming device. More specifically, such magnetic means (a magnetic or metal chip, depending on the one used for the magnetic means of the filming device) are accommodated between two pins 82 vertically projecting from the edge of the base 66 opposite the screen 67, and having a flat front wall which can be pressed against the inner face of the glass wall at the level of the matching lugs 58 on the filming device.

The system as described above makes it possible to implement the method for the secure production of drug preparations, even when syringes and vials of different sizes are used, thanks to the plurality of filming devices having different lens used and to the reflective elements enabling such devices to collect images of the same area: the syringes and vials mounting. This object is further achieved with the smallest possible overall dimensions due to the use of a central prism for both filming devices.

The invention claimed is:

1. A drug preparation system comprising:
(a) a hood enclosure within which is a drug preparation zone;
(b) multiple spaced apart cameras located adjacent the hood enclosure, the cameras including lenses with different focal distances, at least one of the cameras operably zooming in on an image viewed within the drug preparation zone;
(c) a mounting block holding a syringe in a substantially horizontally elongated orientation during drug preparation in the hood enclosure;
(d) in real time, an interface using a video stream to view the syringe in the preparation zone and display information relating to a prescription; and
(e) a computer, connected to the cameras and the interface, operably validating a volume of the drug preparation to assist with determining compliance between the prescription and the drug preparation.

2. The system of claim 1, wherein the cameras comprise:
an overview camera located adjacent an upper portion of the hood enclosure;
a processing camera located adjacent a bottom portion of the hood enclosure; and
the overview camera having a focal length for overall detection of an entire site of the drug preparation zone and the processing camera having a focal length more focused on the syringe or a bottle located within the drug preparation zone.

3. The system of claim 1, further comprising:
operator accessible holes located in the hood enclosure adapted to allow an operator to manually transfer a drug from a bottle or a vial, to the syringe;
the hood enclosure includes a transparent window; and
the drug is a polychemotherapy drug or a toxic cancer treating drug.

4. The system of claim 1, wherein the hood enclosure is portable and includes a backlight adjacent the bottom portion.

5. The system of claim 1, further comprising:
couplings attaching a shell which houses at least one of the cameras, to a window of the hood enclosure; and
magnetic and attracted members removably holding the syringe to the shell.

6. The system of claim 1, wherein:
the interface comprises a dynamic graphic interface, using a video stream from at least one of the cameras, to monitor the drug preparation in real time and operably trigger a warning when preparation non-compliance is detected; and
an indexer is configured to synchronously index preparation steps associated with a prescription with the video stream of the actual drug preparation to allow a posteriori checking.

7. The system of claim 1, further comprising:
an elongated plate retaining the mounting block which is horizontally elongated;
a rack horizontally spaced from the mounting block, the block and the rack holding the syringe;
the rack including multiple parallel and spaces apart walls which project from the elongated plate, the spaced apart walls receiving an enlarged wing of the syringe.

8. The system of claim 1, wherein the computer determines and the interface displays evolution of drug volume taken from at least one of: a bottle, a vial or the syringe.

9. The system of claim 1, wherein the computer determines and the interface displays evolution of drug volume injected into at least one of: a bottle or a vial.

10. The system of claim 1, wherein the computer determines and the interface displays a warning if drug volume is undesirably missing from at least one of: a bottle, a vial or the syringe.

11. The system of claim 1, wherein the computer determines and the interface displays an increment of at least one of: (a) injected drug volume, (b) remaining drug volume, and (c) a number of injections, with regard to at least one of: a bottle, a vial or the syringe.

12. The system of claim 1, wherein:
the cameras comprise two processing cameras, located side-by-side, with their focal lengths being adjustable to detect a bottle, a vial or the syringe in the drug preparation zone; and a scene camera having a focal length for an overall detection of the drug preparation zone and transmitting a video stream.

13. A drug preparation system comprising:
(a) a hood enclosure configured to receive a drug ingredient container in a drug preparation area, the container comprising at least one of: (i) a drip pouch, (ii) a vial, (iii) a bottle, or (iv) a syringe;
(b) a processing camera having a focal length configured to detect the container in the hood enclosure; and
(c) a scene camera having a focal length configured for overall detection of the drug preparation area and transmitting a video stream, the focal lengths of the processing and scene cameras being different;
(d) a computer receiving images from the cameras configured to assist in detecting drug volumes contained in the container during drug preparation; and
(e) a graphic interface and the computer using the video stream to monitor the drug preparation in real time and being configured to trigger a warning when preparation non-compliance is detected.

14. The system of claim 13, further comprising:
a display screen connected to the computer, the display screen being mounted to an upper portion of the hood enclosure, and the display screen showing the graphic interface;
the scene camera is located adjacent to the upper portion of the hood enclosure; and
the processing camera is located adjacent a bottom portion of the hood enclosure.

15. The system of claim 14, further comprising:
operator accessible holes located in the hood enclosure adapted to allow an operator to manually transfer a drug from one of the containers to another of the containers within the hood enclosure;
the hood enclosure includes a transparent window; and
the drug is a polychemotherapy drug or a toxic cancer treating drug.

16. The system of claim 13, wherein the hood enclosure is portable and includes a backlight adjacent a bottom portion of the hood enclosure.

17. The system of claim 13, wherein the computer synchronously indexes preparation steps associated with a prescription with the video stream of actual drug preparation to allow a posteriori checking.

18. The system of claim 13, wherein the computer determines and the graphic interface displays a warning if drug volume is undesirably missing from at least one of the containers.

19. The system of claim 13, wherein the processing camera comprises two processing cameras, located side-by-side, with their focal lengths being adjustable to detect a characteristic of the container in the hood enclosure.

20. A drug preparation system comprising:
(a) a hood enclosure configured to receive a drug ingredient container in a drug preparation area, the container comprising at least one of: (i) a drip pouch, (ii) a vial, (iii) a bottle, or (iv) a syringe;
(b) a processing camera configured to detect the container in the hood enclosure; and
(c) a scene camera configured for overall detection of the drug preparation area and transmitting a video stream;
(d) a computer receiving images from the cameras configured to assist in detecting drug volumes contained in the container during drug preparation;
(e) a graphic interface and the computer using the video stream to monitor the drug preparation in real time and being configured to trigger a warning when preparation non-compliance is detected; and
(f) a syringe mount comprising:
a longitudinally elongated block with a recess adapted to receive a side wall of the syringe thereupon with the syringe being substantially horizontally elongated;
upstanding rack walls spaced away from the block and being adapted to receive an enlarged projecting wing of the syringe during drug preparation; and
the processing camera being focused at a syringe receiving area adjacent the syringe mount.

21. A drug preparation system comprising:
(a) an enclosure;
(b) toxic drug containers located in the enclosure during manual drug production, the containers comprising at least two of: (i) a drip pouch, (ii) a vial, (iii) a bottle, or (iv) a syringe;
(c) a computer;
(d) processing cameras each having an adjustable focal length to assist the computer in automatically identifying the containers in the enclosure;
(e) an overview camera having a focal length configured for overall detection of the drug production and transmitting a video stream, the focal lengths of the processing and scene cameras being different; and
(f) the computer triggering a warning if the container or a volume of a drug ingredient in the containers, does not comply with stored prescription information or stored manual preparation steps.

22. The system of claim 21, further comprising a display screen connected to the computer, the computer and the display screen providing a posteriori analysis of drug preparation imaging data obtained by the cameras.

23. The system of claim 21, wherein:
the overview camera is located adjacent to an upper portion of the enclosure;
the processing cameras are located adjacent a bottom portion of the enclosure; and
the enclosure is portable and includes operator accessible holes adapted to allow an operator to manually transfer the toxic drug from one of the containers to another of the containers within the enclosure.

24. The system of claim 21, wherein the computer determines and a display shows evolution of drug volume taken from at least one of the containers, and the display also showing images from the cameras and prescription information.

25. The system of claim 21, wherein the computer determines and a display shows a warning if drug volume is undesirably missing from at least one of the containers, and the display also showing images from the cameras and prescription information.

26. The system of claim 21, wherein the computer determines and a display shows an increment of at least one of: (a) injected drug volume, (b) remaining drug volume, and (c) a number of injections, with regard to at least one of the containers.

27. The system of claim 21, wherein one of the containers is the syringe which is mounted in a substantially horizontal orientation within the enclosure during the camera imaging thereof.

28. The system of claim 21, wherein:
a processor of the computer compares stored data of drug preparation in progress provided by recorded camera images, with steps associated with a stored prescription;

the processor recognizes a key production step and then identifies the preparation in progress, which is displayed to the user; and the processor selects information based on the prescription detected and based on the containers.

\* \* \* \* \*